June 23, 1953 — H. M. GEYER ET AL — 2,642,752

ACTUATOR

Filed Nov. 29, 1951

INVENTORS
HOWARD M. GEYER
NORMAN J. BULLOCK
BY
their ATTORNEYS

Patented June 23, 1953

2,642,752

UNITED STATES PATENT OFFICE 2,642,752

ACTUATOR

Howard M. Geyer and Norman J. Bullock, Dayton, Ohio, assignors to General Motors Corporation, Detroit, Mich., a corporation of Delaware Application November 29, 1951, Serial No. 258,956

4 Claims. (Cl. 74—424.8)

This invention relates to an actuator capable of translating rotary motion into reciprocatory motion.

It is among the objects of the present invention to provide an actuator for translating rotary motion into reciprocatory motion for the purpose of extending and retracting the actuator to move a load back and forth. The design and construction of this actuator is of such a character that the device, although light in weight and of reduced size to require minimum space, is sufficiently sturdy to move a substantial load.

Further objects and advantages of the present invention will be apparent from the following description, reference being had to the accompanying drawings wherein a preferred embodiment of the present invention is clearly shown.

Figure 2:
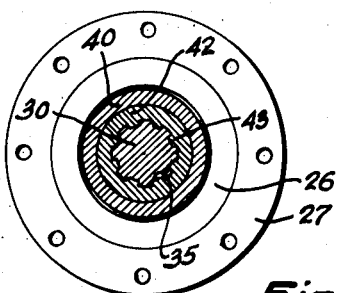
Fig. 2 is a sectional view taken along the line and in the direction of the arrows 2—2 in Fig. 3.
Figure 3:
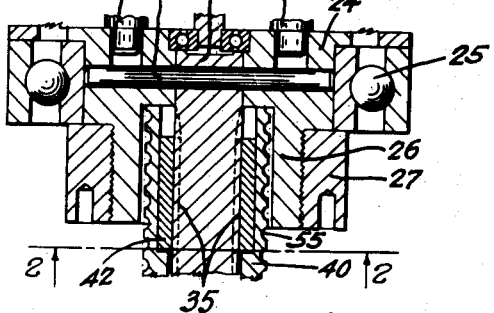
Fig. 3 is an enlarged, sectional view of one portion of an area of Fig. 1.

The present actuator is particularly adapted for use in aircraft, one portion of the actuator being attachable to a stationary element, the other to an element to be adjusted such as a rudder, stabilizer, wing-tip or the like. For this reason, it is desirable to have the actuator weigh as little as possible and also to be of small size so as to require minimum space in its installation on aeronautical conveyances.

The actuator as illustrated comprises a composite housing 20 providing means 21 for attaching the housing portion to any desirable stationary part of the aircraft or if a reverse connection is desired, this portion of the actuator may be applied to the movable part and another portion to the stationary part of the aircraft. The housing supports the power device which operates the actuator, said device being shown as an electric motor 22 attached to the housing in any suitable manner. The usual speed reducing gearing, if necessary, is contained within the housing 20 and is operatively connected through studs 23 with the rotatable driving block 24. The drawings illustrate a ball bearing 25 provided within the housing 20 for rotatably supporting the block 24. A depending cylindrical extension 26 on said block is exteriorly threaded to receive the clamping collar 27, which retains the block in proper position within the inner race of the ball bearing 25 and at the same time reenforces and stiffens the block.

Figure 1:
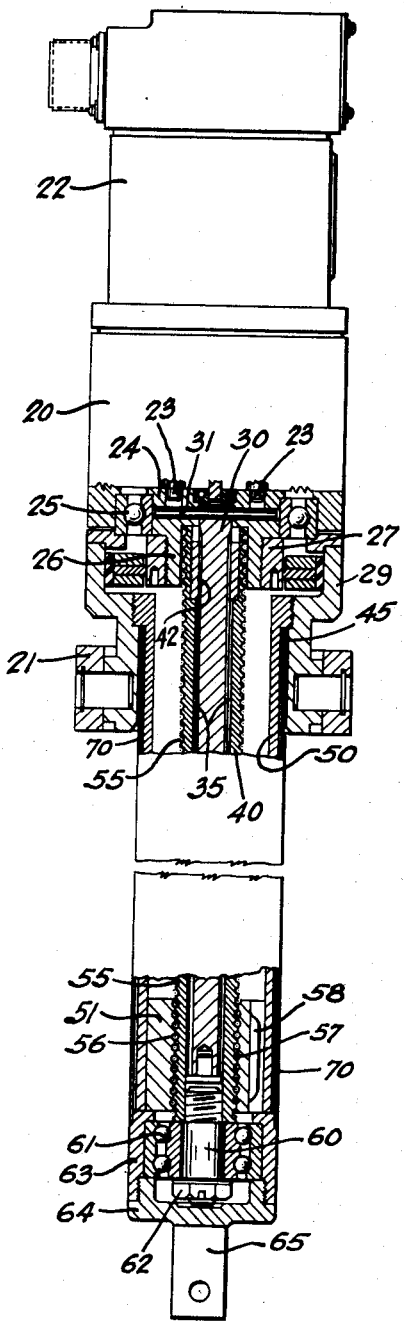
Fig. 1 is an elevational view, partly in section, of the actuator.

A central opening in block 24 receives the one end of the drive shaft 30 which is attached to said block by a cross-pin 31 extending through aligned openings in the block and drive shaft. Thus, the electric motor 22 is connected with the drive shaft 30 through the drive block 24 and will rotate said drive shaft 30 in one direction or the other inasmuch as the electric motor 22 is of the reversible type. The drive shaft portion extending from the block 24 has its outer peripheral surface provided with longitudinal grooves 35 extending throughout the length of the drive shaft. A tubular screw shaft 40 surrounds the drive shaft 30 and is slidable longitudinally thereon. This screw shaft 40 is of such a length that when its one end engages the drive block 24 as shown in Fig. 1, the other end of the screw shaft 40, surrounding said drive shaft 30, extends beyond the free end of said drive shaft. The end of the screw shaft 40 more adjacent the drive block 24 is recessed to receive a key ring 42 which is immovably secured within the recess of the screw shaft 40 in any suitable manner. The inner annular surface of said key ring 42 has longitudinal keys 43 each one of which extends into a groove 35 of the drive shaft 30 so as to be slidable therein. Thus this key ring 42 immovably attached to the screw shaft 40 operatively connects said screw shaft with the drive shaft 30 so that the screw shaft must rotate with said drive shaft but may move longitudinally thereon in either direction as it is being rotated.

The housing 29 has a recess 45 coaxial of the drive shaft 30 and the screw shaft 40. One end of a tubular casing 50 extends into said recess 45 and is secured to the housing 20 within said recess at its inner end in such a manner as to be immovably secured to said housing. The portion of the tubular casing 50, attached to the housing 20, is of greater outside diameter than the remaining body portion of the casing within the recess 45 so that an annular space is provided for the greater length of said recess between the outer peripheral wall of the casing and the inner annular wall of the recess. The tubular casing 50 extends outside the housing for a predetermined length and at the outer end of said casing and inside thereof there is immovably attached a sleeve 51 which may be termed a "nut" inasmuch as it surrounds the screw shaft 40 and is mechanically connected therewith so that in response to rotation of said screw shaft 30 it will move axially through said nut in one direction or the other, dependent upon the direction of rotation of the drive shaft by the electric motor 22. In order to reduce friction to a minimum, the ordinary screw thread connection between the nut 51 and the screw shaft 40 has been replaced by the well-known ball-screw connection which comprises a spiral groove 55 in the outer annular surface of the screw shaft 40 and a similar spiral groove 56 in the inner annular wall of the nut 51 surrounding said screw shaft. These two spiral grooves cooperate to form a continuous spiral passage between the nut and shaft occupied by balls 57 which, by the aid of a shunting duct 58, circulate through the spiral passage and thereby mechanically connect the nut to the screw shaft 40 in the manner of the ordinary screw threads.

To perform its function, the screw shaft 40 of the actuator must be anchored or attached to one of the parts of the aircraft which is to be adjusted by the actuator. In the present construction the outer end of the tubular screw shaft is interiorly threaded to receive the threaded end of a stud 60, upon the cylindrical body portion of which is mounted a ball bearing 61. The inner race of this ball bearing, mounted upon stud 60, is securely held in position against the adjacent end of the screw shaft 40 by the head 62 of the stud 60. A flanged cup member 63 embraces the outer race of the ball bearing 61 and receives a clamping cap 64 screw-threaded on said cup 63 so as rigidly to clamp the outer race of the ball bearing 61 within this assembly hereinafter referred to as the attachment member. This cap 64 has an extending lug 65 providing the means by which this attachment member of the actuator is attachable to the aircraft. When the actuator is completely retracted as shown in Fig. 1, the inner end of the cup-shaped portion 63 abuts against the outer, free end of the tubular casing 50.

The actuator of the present invention is provided with a protective cylindrical shell 70 one end of which is secured to the cup-shaped portion 63 of the attachment member, the other end of said cylindrical shell extending into the space between the casing 50 and the housing 29 when the actuator is fully retracted. This protective shell 70 moves with the attachment member and at all times provides a protective device for the screw shaft 40, inasmuch as it surrounds said shaft and at least a portion of the casing 50 at all times even though the actuator be fully extended.

The particular arrangement of the attachment member, the screw shaft 40 and the ball bearing 61 contained within the attachment member provides an end thrust bearing against which the outward thrust of the screw shaft 40 is exerted when the load, anchored to the lug 65, is moved in one direction, this ball bearing rotatably supporting the screw shaft 40 within the non-rotatable, but axially movable attachment member.

Figure 4:
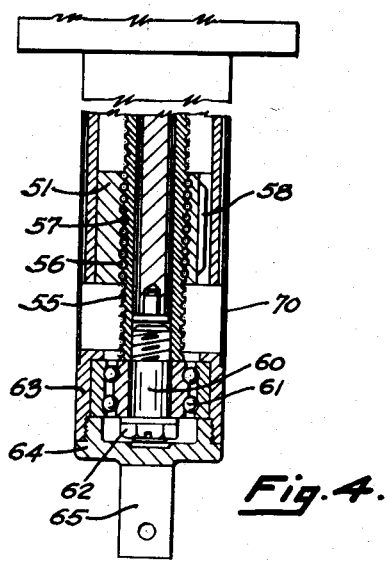
Fig. 4 is a fragmentary, sectional view of the lower portion of the actuator shown in Fig. 1, in a differently operated position, however.

From the aforegoing it may be seen that the actuator may be operated in either direction by the reversible electric motor 22 which, as it operates in one direction, causes extension of the actuator inasmuch as in response to said one rotation, screw shaft 40, rotating in nut 51, will move axially outwardly thereof, exerting a thrust upon the inner race of the ball bearing 61 to move the attachment member, consisting of cup 63 and cap 64, outwardly and away from the casing 50 as shown in Fig. 4. This figure illustrates the protective shell 70 surrounding both the screw shaft 40 and the tubular casing 50 thus protecting the exposed portion of the screw shaft from damage either by direct contact or by the presence of accumulated dirt. In response to a rotation of the electric motor 22 in the opposite direction and a consequent rotation of the screw shaft 40 in the same opposite direction, said shaft will move axially through the nut 51 so as to cause retraction of the actuator during which time the attachment member, consisting of cup 63 and cap 64, will be moved to approach and eventually engage the end of the tubular casing 50 as shown in Fig. 1.

The particular construction including the splined connection between the drive shaft 30 and the driven screw shaft 40 and the construction of the end thrust bearing at the end of the screw shaft which is capable of safely taking the necessary end thrust to move the load and at the same time rotatably supports the screw shaft within the non-rotatable attachment member of the actuator, permits a substantial reduction in the diametral size of the actuator and at the same time provides a sturdy structure capable of moving a substantial load.

While embodiment of the present invention is herein disclosed constitutes a preferred form, it is to be understood that other forms might be adopted.

What is claimed is as follows:

1. An actuator comprising in combination, a housing; a member rotatably supported by said housing; a reversible power device connected to said member for rotating it in either direction; a drive shaft secured at one end to said member so as to be rotated thereby; a tubular shaft around the drive shaft and keyed thereto to rotate with and move longitudinally relatively to said drive shaft; a tubular casing attached to the housing; a nut attached within the casing at its free end, said nut surrounding and being connected to the tubular shaft so that rotation of the tubular shaft causes said shaft to move axially relatively to the nut and longitudinally of the drive shaft as it rotates therewith; an end thrust bearing attached to the free end of the tubular shaft, said end thrust bearing supporting an attachment member engageable with the nut carrying casing when the actuator is fully retracted; and a tubular shell secured to the attachment member and surrounding the tubular casing, said shell providing a protective housing about the tubular shaft as it moves out of the nut during the extending cycle of the actuator.

2. An actuator comprising in combination, a housing; a power device capable of reverse operation mounted on said housing; a shaft rotatably supported by the housing and connected to the power device so as to be rotated thereby; a tube surrounding the shaft and mechanically connected therewith so as to be rotated thereby and be movable longitudinally relatively thereto; a tubular casing surrounding the said tube and having its one end attached to the housing; a sleeve-like member attached within the tubular casing adjacent its free end and surrounding the tube; means mechanically connecting the sleeve-like member with the tube, said means being operative to cause said tube to move axially of said member in response to rotation of the tube; an end thrust bearing secured to the free end of the tube; a mounting element carried by said bearing causing the said element to move axially with the tube and permitting said tube to rotate relatively to said element; and a cylindrical shell surrounding the tubular casing, one end of the shell being attached to the mounting element, the other end portion of said shell telescopically extending into a recess of the housing when the actuator is fully retracted so that the mounting member engages the casing.

3. An actuator comprising in combination, a housing; a member rotatably supported within said housing; an electric motor connected to said member, said motor being operative to rotate said member in either direction; a drive shaft attached at one end to said member so as to be rotated thereby, the outer peripheral surface of said shaft having longitudinal grooves forming key-ways; a hollow screw shaft surrounding said drive shaft, the outer peripheral surface of said screw shaft having a spiral groove extending uninterruptedly from one end of the screw shaft to the other; a sleeve secured in a recess at the end of the screw shaft more adjacent the housing, said sleeve having longitudinal projections extending from its inner annular surface forming keys slidably fitting into the respective longitudinal grooves in the screw shaft whereby the screw shaft is secured to the drive shaft so as to be rotated thereby and be movable longitudinally thereon; a tubular casing having one end attached within a recess in the housing said casing extending from said housing; a sleeve secured within the casing adjacent its free end said sleeve surrounding the screw shaft, the inner annular surface of said sleeve having a spiral groove coinciding and cooperating with the spiral groove in the screw shaft to form a spiral passage between the shaft and sleeve; ball bearings in said passage operatively connecting the sleeve with the shaft so that the shaft, when rotated, moves axially through said sleeve; a ball bearing attached to the free end of the screw shaft; a mounting member supported by a portion of said ball bearing so as to be moved by axial movement of the shaft but capable of being held against rotation while said shaft is being rotated; and a cylindrical guard shell surrounding the casing, one end of the shell being attached to the mounting member, the other end being telescopically receivable by the housing recess in which the casing is secured, when the actuator is retracted to move the mounting member toward the end of the casing.

4. An extensible and retractable actuator comprising in combination, a housing; a reversible power device mounted on said housing; a bearing in the housing, rotatably supporting a block which is operatively connected to the power device so as to be rotated thereby; a drive shaft having its one end attached to the block, said shaft extending coaxially from said block, the outer peripheral surface of said shaft having longitudinal grooves extending throughout the length of the shaft outside the block; a hollow screw shaft slidably fitting about the drive shaft and extending beyond the free end thereof; a key-ring immovably secured within a recess in the end of the screw shaft more adjacent the block and having longitudinal keys slidably fitting into the respective grooves in the drive shaft; a nut operatively carried by the screw shaft, said nut being attached in one end of a cylinder, the other end of said cylinder being attached to the housing within a recess therein; a plug secured within the end of the drive shaft opposite the key-ring, said plug supporting one member of a roller bearing; a shell secured to and supported by another member of said roller bearing, said shell providing a mounting lug movable axially with the drive shaft but not rotatable therewith; and a protective casing secured to the shell, surrounding the cylinder and adapted to enter the recess of the housing in which the cylinder is attached to said housing when the actuator is fully retracted.

HOWARD M. GEYER.
NORMAN J. BULLOCK.

No references cited.